Aug. 3, 1948.　　　B. M. WOLFE　　　2,446,354
FISHING REEL
Filed Dec. 2, 1944　　　2 Sheets-Sheet 1
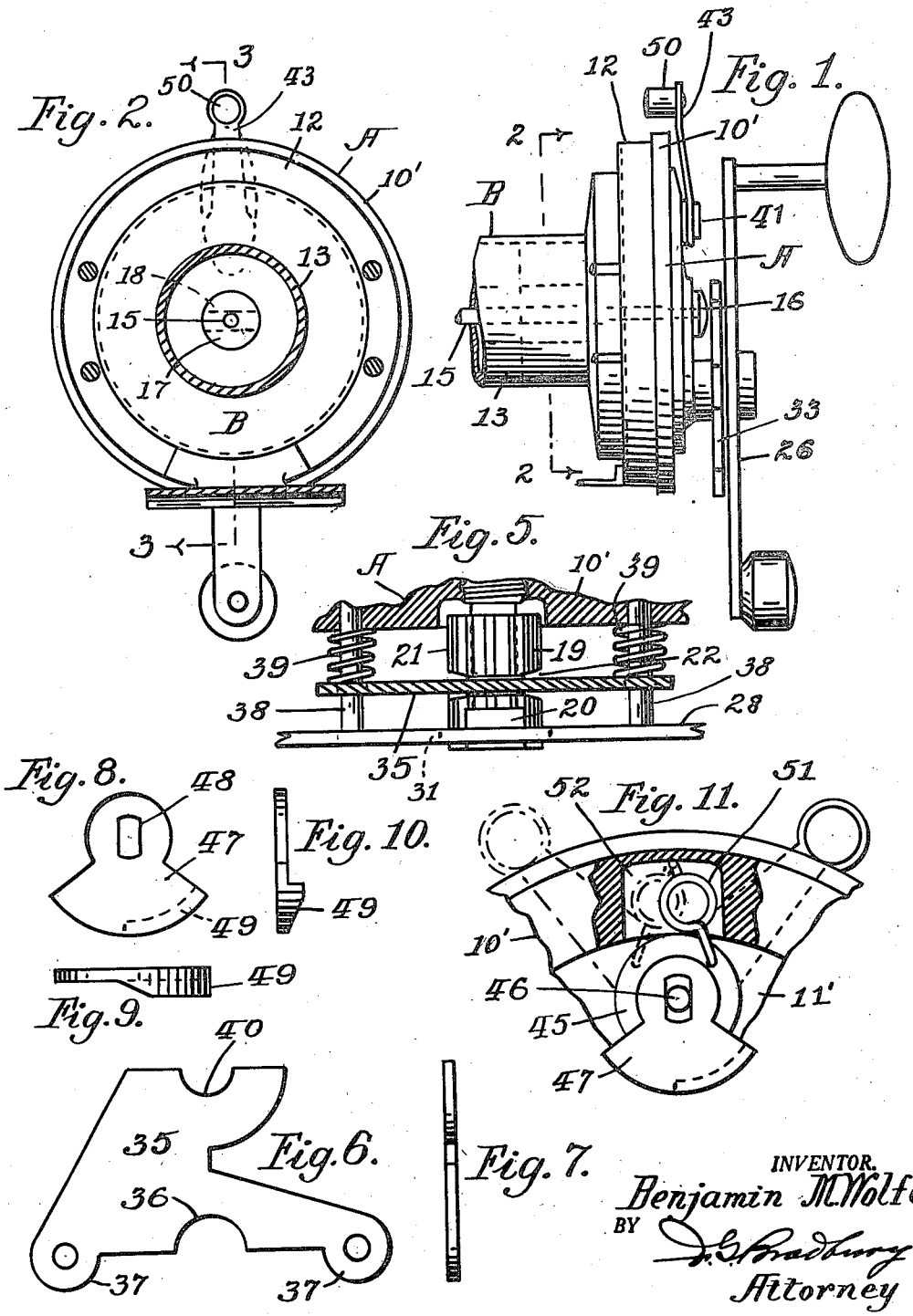
INVENTOR.
Benjamin M. Wolfe
BY
F. G. Bradbury.
Attorney Aug. 3, 1948.   B. M. WOLFE   2,446,354
FISHING REEL
Filed Dec. 2, 1944   2 Sheets-Sheet 2
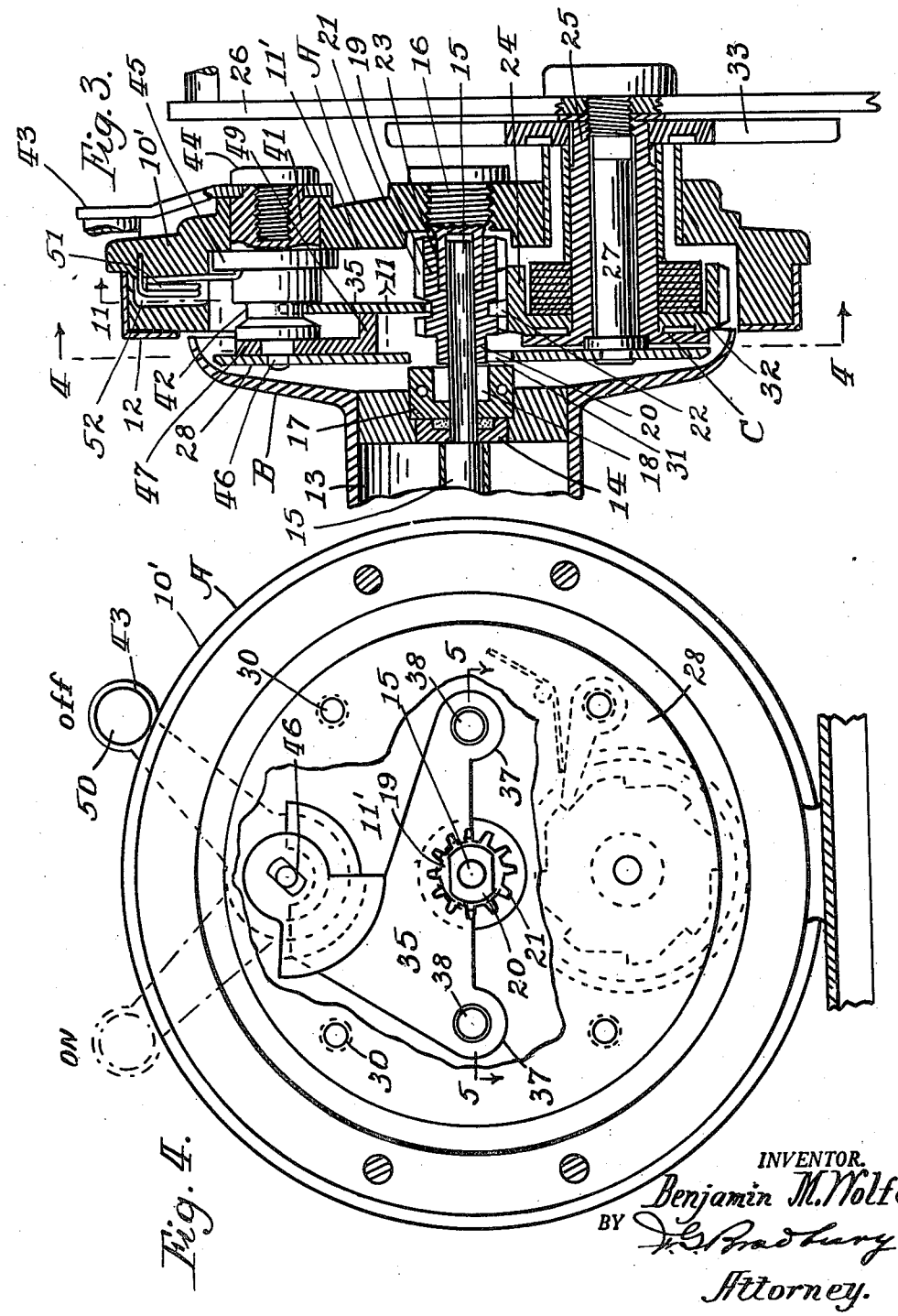
INVENTOR.
Benjamin M. Wolfe
BY
J. G. Bradbury.
Attorney.

Patented Aug. 3, 1948

2,446,354

UNITED STATES PATENT OFFICE 2,446,354

FISHING REEL

Benjamin M. Wolfe, Monterey Park, Calif.

Application December 2, 1944, Serial No. 566,315

1 Claim. (Cl. 242—84.7)

My invention relates to improvements in fishing reels and particularly to that class in which a hand operable clutch is provided between a freely revoluble spool and suitable hand operable drive gearing, whereby the spool is driven at suitable speed and is released to spin freely or at retarded speed.

An object of my invention is to provide improved means by which the clutch which is employed is easily shifted into engaged or disengaged position. Another object is to provide improved means by which the parts of the clutch are retained automatically in either fully engaged or disengaged condition. Among further objects are maximum simplicity and strength of construction, smoothness of operation, greater effectiveness in use, and the production of means by which the parts can be easily dismantled and do not easily get out of running condition.

In the accompanying drawings forming part of this specification, Fig. 1 is a side elevation of a portion of a fishing reel, showing the operating head end and a portion of the fishing reel spool; Fig. 2 is a section taken on the line 2—2 of Fig. 1; Fig. 3 is a longitudinal section taken on the line 3—3 of Fig. 2; Fig. 4 is an end elevation of that portion of the structure shown in Fig. 3, looking at the inner face; Fig. 5 is a section of a detail taken approximately on the line 5—5 of Fig. 4; Fig. 6 is a plan of the clutch actuator; Fig. 7 is an end elevation of the structure shown in Fig. 6; Fig. 8 is a plan of the cam; Fig. 9 is a top end view of the cam shown in Fig. 8; Fig. 10 is a horizontal end view of the cam shown in Fig. 8, and Fig. 11 is a section of a detail taken approximately on line 11—11 of Fig. 3, showing the snap action spring which is employed to retain the driving clutch member in "on" or "off" position.

My improved reel has the usual frame structure composed of end plates which are held rigidly apart by spacer bolts and mounted upon a clip by which the reel as a whole is secured on the butt end of a fishing pole. Also a spool upon which the fishing line is wound is freely journaled between the end plate members in the usual manner so that it can be engaged or disengaged by suitable driving mechanism, the latter being driven by the usual hand operable crank and including the usual drive gearing by which the speed at which the spool is driven is multiplied or the spool is released to spin freely or under the influence of a drag or click.

My improvement applies particularly to improved clutch engaging means 14 and 17 which is applied between suitable drive gearing C and a spool B. The drawings therefore illustrate only those parts of the reel which are affected by my improvement.

In the drawings (Figs. 1 to 4 inclusive) A represents the end member of the frame structure in which the driving means is installed, and B a portion of the spool. The end member resembles a circular body 10', composed of plastic or other suitable material having an annular chamber 11' in its inner side and an annular peripheral reinforcing rim 12. These parts are of usual construction the fishing line being wound upon the spool and said spool having its hub 13 suitably journaled by bearings such as 14 (Fig. 3) upon an axle or shaft 15. One end of this axle is rigidly seated in the inner end of a cup screw 16, which latter is threadedly engaged inwardly in the end plate A. The axle is coaxially arranged in the spool so that the spool is normally free to revolve on said axle or under the influence of the hydraulic retarding means set forth in my companion application for patent filed September 4, 1944, bearing Serial Number 552,691, now abandoned. The end of the hub of the spool B facing the end frame member A is provided with the female clutch member 17, which is coaxial with the spool and has a flat sided clutch engaging transverse slot or recess 18 (Fig. 2). This clutch member is rigidly attached to the journal bearing 14 and revolves with the spool on the axle.

Arranged to slide freely longitudinally on the axle 15 (Fig. 3) is the male clutch member 19, which resembles a gear toothed pinion or sheave having a flat sided clutch engaging head 20 on its forward end corresponding to mesh with the slot 18 in the female clutch member 17. The male clutch member 19 also has a gear toothed perimeter 21, an annular clutch impeller engaging channel 22 and an annular opening 23 in its rearward end. The latter slidably seats the inner end of the cup screw 16. The toothed perimeter of the male clutch member 19 slidingly engages the driving gear 24 of the ordinary driving mechanism C which is provided in the chamber of the end member A. This driving mechanism as shown (Figs. 1 to 4 inclusive) has a main drive sleeve 25 which is driven by the hand operable crank 26 and is journaled on the stationary stub axle 27 which is rigidly mounted upon the inner auxiliary supporting plate 28 (Fig. 5). This auxiliary supporting plate constitutes part of the supporting framework on the end plate A and is secured to the end plate by suitable spacer bolts 30 (Fig. 4). A centrally disposed opening 31 (Fig. 5) is provided in the supporting plate 28 to admit the head 20 of the male clutch member 19 freely. The teeth of the driving gear 24 (Fig. 3) slidingly engage the teeth of the driving clutch member 19 and said driving gear is operatively engaged with the driving sleeve 25 through the compressible friction retarding disks 32, of usual type, which are applied under variable pressure by the hand operable drag wheel 33.

The shiftable male clutch member 19 is operated by an actuator 35 (Figs. 3 and 19) which resembles a yoke. The median portion of the lower edge of this yoke has a semicircular opening 36, the edge of which engages the male clutch member 19 freely in its annular channel 22. The arms of the yoke have collars 37 which are substantially equally distanced laterally from said opening. These collars 37 are mounted upon the pair of longitudinal guide pins 38 (Fig. 4) which are disposed parallel to the axle 15 and are secured rigidly between the auxiliary supporting plate 28 and the end plate A of the reel. Helical expansion springs 39 (see Fig. 5) are threaded freely over the guide pins 38 and are interposed between the clutch actuator 35 and the inner wall of the chamber 11'. These springs normally tend to tilt the clutch actuator 35 forwardly, thus sliding the male clutch member longitudinally into driving connection with the driven clutch member of the spool. The springs apply spring action evenly on the lateral extremities of the actuator and function to drive the male clutch member into connection with the driven clutch member. The upper end of the clutch actuator 35 directly above the opening 36 has a circular opening 40, the semicircular edge of which engages a longitudinally disposed rotatable stud or swivel 41, between the shoulders of an annular groove 42 therein. This latter engagement acts as a fulcrum support for the upper end of the actuator 35. This stud is revolubly seated by its forward end in the body of the end plate A and carries a manually operable crank arm 43 which is secured by the screw 44. An annular shoulder 45 on the body of the stud assists in revolubly holding the stud longitudinally in the end plate. The inner portion of the stud has a reduced end 46 by which the stud is swiveled in the auxiliary supporting plate 28.

Keyed upon the stud 41 within chamber 11' is a cam body 47, the key connection being by flat engaging sides 48, whereby the cam body is revolved by swinging the hand operable crank arm 43. One side of the cam body is provided with an annular shoulder 49 which is concentric with the axis of said stud and bears against the side of the clutch actuator 35 between the fulcrum and work applying points of the latter to normally tilt the actuator with its work end depressing the springs 39 and holding the male clutch member 19 free from engagement with the female clutch member 17 in the spool B. By reversing the throw of the operating arm 43 from the full line "off" position into the broken line "on" position shown in Fig. 4, the clutch actuator is released and permitted to swing upon its fulcrum to release the male clutch member into interlocking connection with the female clutch member and thus connect the hand operated drive gearing with the spool to revolve and operate the latter. A knob 50 on the free end of the crank operating arm 43 is arranged to strike the outer edge of the end plate A to limit the throw of said arm into "on" or "off" position.

A helical expansion spring 51 (Fig. 11), seated freely in the chamber 52 in end plate A (Fig. 1) has its ends radiating diametrally along a line in opposite directions from the center of the spring. The upper end of this spring is movably anchored to the end plate A (Fig. 3) and the lower end is movably secured to the shoulder 45 of the stud 41 (Fig. 3). This arrangement is such that as the stud 41 (Fig. 3) is rotated by swinging the operating arm 43, the spring 51 is swung into off set positions transversely in relation to said line, whereby the thrust movement imparted by the arms of the spring causes the cam to snap into and releasably hold the actuator in either "on" or "off" position, corresponding with the movement and operation of the driving member 19 (Figs. 3 and 5) of the clutch.

In accordance with the patent statutes, I have described the principles of operation of my invention together with the construction thereof which I now consider to represent the best embodiment thereof, but I desire to have it understood that the construction shown is only illustrative and that the invention can be carried out by other means and applied to uses other than as above set forth within the spirit of the invention and the scope of the following claim:

I claim:

In a fishing reel having a supporting head; a freely revoluble spool provided with a two part clutch; one part of which is permanently connected with said spool and the other slidably supported within said head, and an operating stud journaled freely in said supporting head having a manually operable crank arm on its outer end portion and an annular groove in its inner end portion; an actuator for said slidably supported clutch member comprising a yoke having opposite compensating arms and its body portion operatively engaged with said slidable clutch member, guides in said supporting head for the outer end portions of said arms, compression springs on said guides for compensating and tilting the actuator to engage the sliding clutch member with the driven clutch member, and an actuating arm portion extending laterally from the body portion of said yoke having its outer end portion freely fulcrumed and rotatively engaged between the walls of the groove in said stud, and a crank arm extending laterally from the inner end portion of said stud and having a cam surface impressed against the median portion of said actuating arm between said fulcrum and clutch elements to effect the release of said sliding clutch member by the rotation of said stud.

BENJAMIN M. WOLFE.

REFERENCES CITED

The following references are of record in the file of this patent:

UNITED STATES PATENTS

| Number | Name | Date |
| --- | --- | --- |
| 987,676 | Vom Hofe | Mar. 21, 1911 |
| 1,523,983 | Lauterbach | Jan. 20, 1925 |
| 1,940,593 | Henze | Dec. 19, 1933 |
| 2,129,386 | Schafer | Sept. 6, 1938 |
| 2,197,779 | Coxe | Apr. 23, 1940 |